United States Patent
Dunn Berger et al.

(10) Patent No.: US 8,407,420 B2
(45) Date of Patent: Mar. 26, 2013

(54) SYSTEM, APPARATUS AND METHOD UTILIZING EARLY ACCESS TO SHARED CACHE PIPELINE FOR LATENCY REDUCTION

(75) Inventors: Deanna Postles Dunn Berger, Poughkeepsie, NY (US); Michael F. Fee, Cold Spring, NY (US); Robert J. Sonnelitter, III, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 12/821,721

(22) Filed: Jun. 23, 2010

(65) Prior Publication Data
US 2011/0320694 A1    Dec. 29, 2011

(51) Int. Cl.
G06F 13/00 (2006.01)
G06F 12/08 (2006.01)
(52) U.S. Cl. .......... 711/130; 711/140; 711/169
(58) Field of Classification Search .......... 711/130, 711/140, 169
See application file for complete search history.

(56) References Cited

U.S. PATENT DOCUMENTS

| | | | | |
|---|---|---|---|---|
| 4,695,943 | A * | 9/1987 | Keeley et al. | 711/140 |
| 6,055,605 | A * | 4/2000 | Sharma et al. | 711/130 |
| 6,101,589 | A * | 8/2000 | Fuhrmann et al. | 711/169 |
| 6,330,643 | B1 * | 12/2001 | Arimilli et al. | 711/141 |
| 6,738,870 | B2 * | 5/2004 | Van Huben et al. | 711/150 |
| 7,181,575 | B2 * | 2/2007 | Carlson | 711/140 |
| 7,200,738 | B2 | 4/2007 | Crook et al. | |
| 7,711,930 | B2 | 5/2010 | Dieffenderfer et al. | |
| 2005/0206648 | A1 * | 9/2005 | Perry et al. | 345/557 |
| 2007/0073974 | A1 * | 3/2007 | Averill et al. | 711/133 |

* cited by examiner

*Primary Examiner* — Sanjiv Shah
*Assistant Examiner* — Glenn Gossage
(74) *Attorney, Agent, or Firm* — Cantor Colburn LLP; John Campbell

(57) ABSTRACT

A memory system, apparatus and method for performing operations in a shared cache coupled to a first requester and a second requester. The method includes receiving at the shared cache a first request from the second requester; assigning the request to a state machine; transmitting a first pipe pass request from the state machine to an arbiter; providing a first instruction from the first pipe pass request to a cache pipeline, the first instruction causing a first pipe pass; and providing a second pipe pass request to the arbiter before the first pipe pass is completed. The first requester may be a lower level cache such as an L2 cache, or an I/O device and the second requester may be an upper level cache such as an L4 cache, and the first request may be a coherency request.

19 Claims, 4 Drawing Sheets

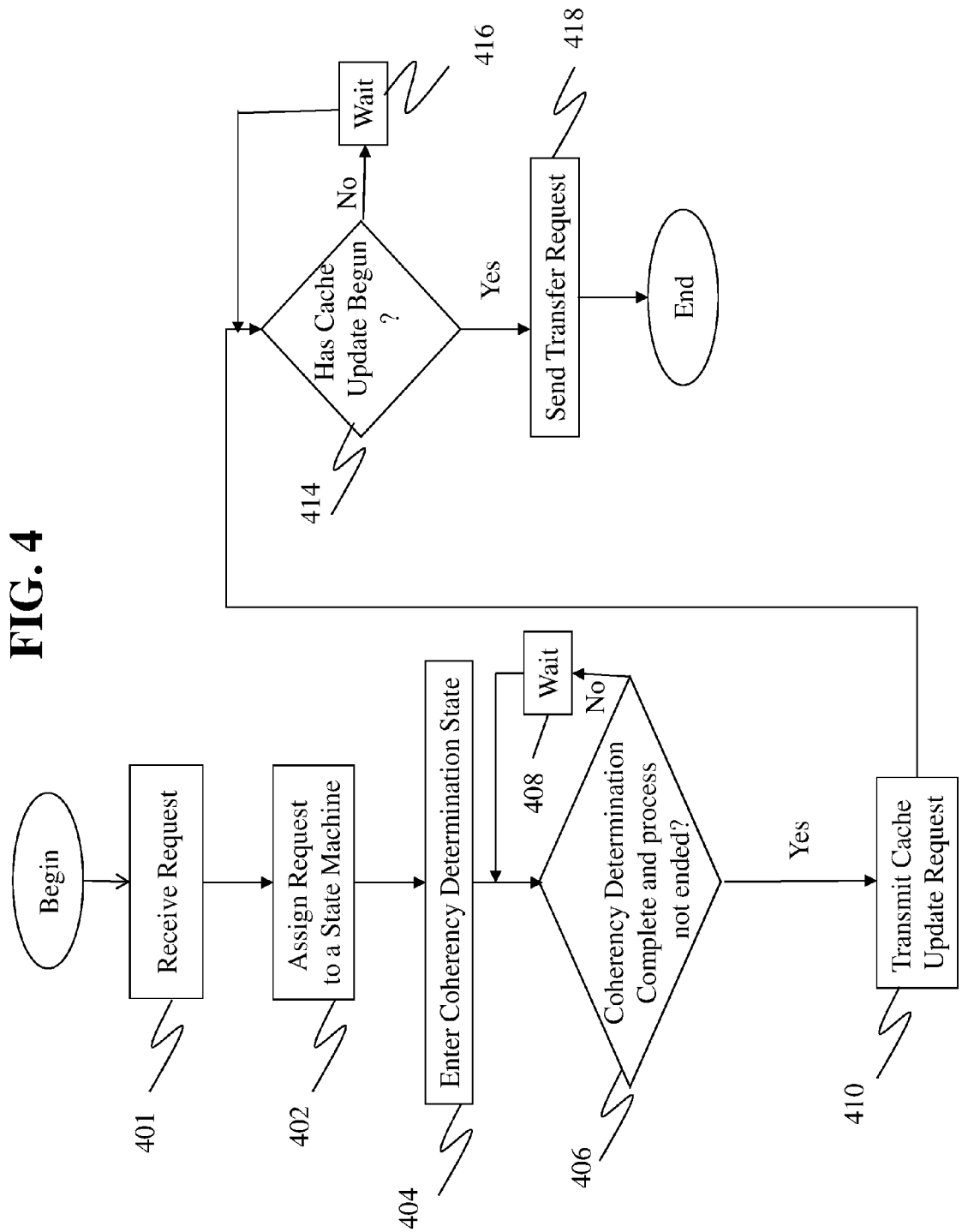

SYSTEM, APPARATUS AND METHOD UTILIZING EARLY ACCESS TO SHARED CACHE PIPELINE FOR LATENCY REDUCTION

BACKGROUND

This invention relates generally to processing within a computing environment, and more particularly to reducing latency in shared caches.

In computers, a cache is a component that improves performance by transparently storing data such that future requests for that data can be served faster. The data that is stored within a cache might be values that have been computed earlier or duplicates of original values that are stored elsewhere (e.g. main memory). If requested data is contained in the cache (cache hit), this request can be served by simply reading the cache, which is comparably faster. Otherwise (cache miss), the data has to be recomputed or fetched from its original storage location, which is comparably slower.

Cache operations in a shared cache may be performed by accessing a shared pipeline. A pipeline may be considered as a set of data processing elements connected in series, so that the output of one element is the input of the next one. An instruction pipeline may be used in a computing device to increase instruction throughput (the number of instructions that can be executed in a unit of time). The fundamental idea is to split the processing of a computer instruction into a series of independent steps, with storage at the end of each step. This allows the computer's control circuitry to issue instructions at the processing rate of the slowest step, which is much faster than the time needed to perform all steps at once. The term pipeline refers to the fact that each step is carrying data at once (like water), and each step is connected to the next (like the links of a pipe.)

In shared cache pipelines, operations are typically comprised of a number of discreet yet dependent steps which each require a pass through the shared pipeline. The operation is complete when all required passes through the pipeline have completed. Since these passes are done serially, the total time to complete the operation is the sum of the time of each pipe pass. Reducing the time to complete any individual pipe pass would therefore reduce the overall time necessary to complete the operation.

BRIEF SUMMARY

An embodiment of the present invention is directed to an apparatus for storing electronic information. The apparatus of this embodiment includes a first requester, a second requester, and a shared cache coupled to both the first requester and the second requester. The shared cache includes a cache controller configured to receive a first request from the second requester and provide a response to the second requester, the response being based on a status of the first requester. The cache controller includes a cache pipeline and a state machine configured to process the first request by transmitting first and second pipe pass requests for access to the cache pipeline. The state machine is configured to transmit the second pipe pass request before a first pipe pass caused by the first pipe pass request is completed.

Another embodiment of the present invention is directed to a computer implemented method of performing operations in a shared cache coupled to a first requester and a second requester. The method of this embodiment includes receiving at the shared cache a first request from the second requester; assigning the first request to a state machine; transmitting a first pipe pass request from the state machine to an arbiter; providing a first instruction from the first pipe pass request to a cache pipeline, the first instruction causing a first pipe pass; and providing a second pipe pass request to the arbiter before the first pipe pass is completed.

Another embodiment of the present invention is directed to a memory system for use in a computing system. The memory system of this embodiment includes a plurality of processing units, at least two lower level caches each coupled to one of the plurality of processing units, an upper level cache and a shared cache coupled to the at least two lower level caches and the upper level cache. The shared cache includes a cache controller configured to receive a first request from the upper level cache and provide a response to the upper level cache based on a status of at least one of the at least two lower level caches. The cache controller includes a cache pipeline and a state machine configured to process the first request by transmitting first and second pipe pass requests for access to the cache pipeline. The state machine is configured to transmit the second pipe pass request before a first pipe pass caused by the first pipe pass request is completed.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 4 depicts a typical sequence of operations that an L3 cache controller may perform according to one embodiment;

DETAILED DESCRIPTION

An exemplary embodiment of the present invention provides systems and methods for allowing tightly coupled pipe passes entry into a shared cache pipeline in quick succession, so the second pass is requested before the first pass completes. In some instances, this may result in the second pass beginning before the first pass completes.

Figure 1:
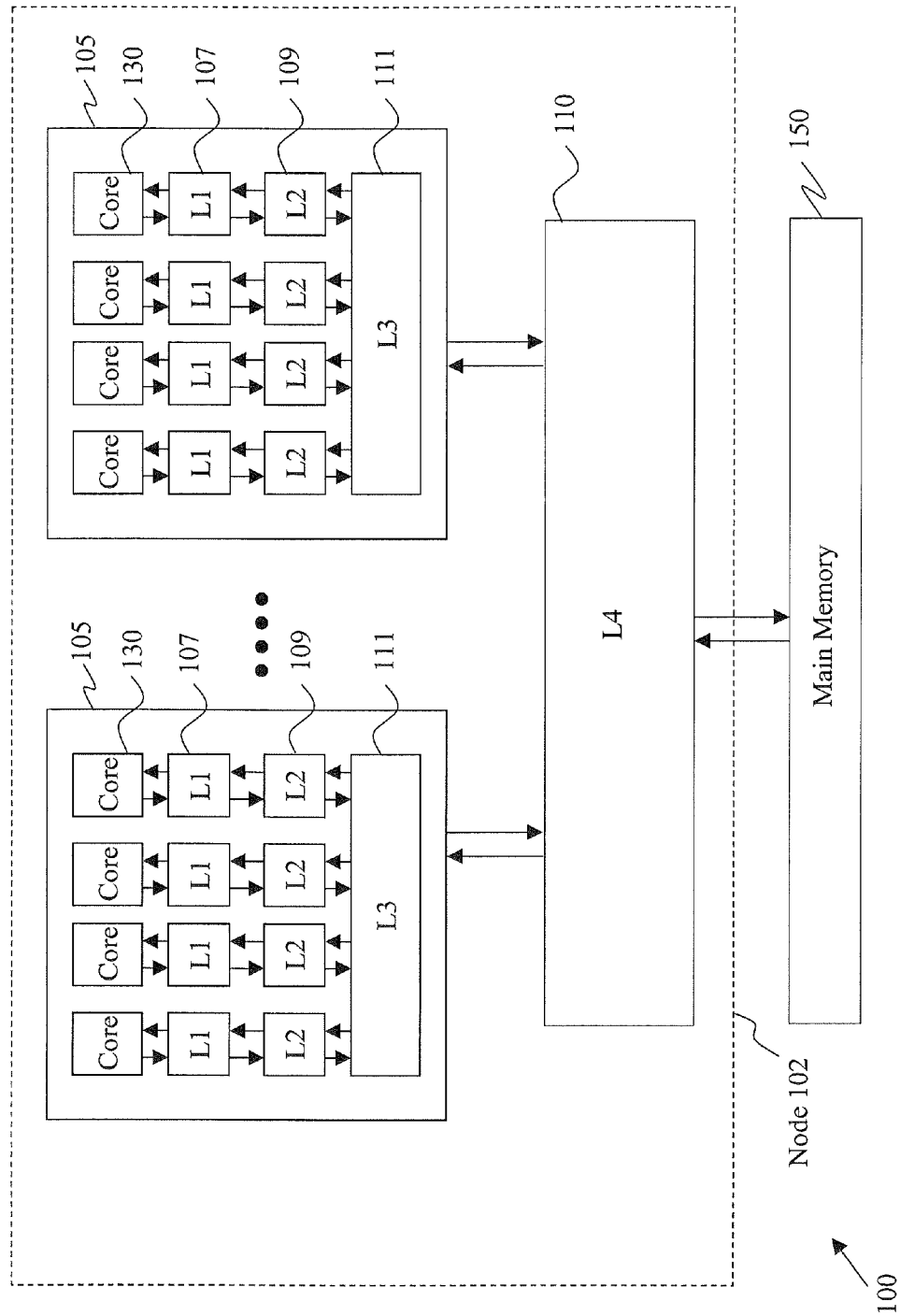
FIG. 1 depicts an example of system on which embodiments of the present invention may be implemented.

FIG. 1 illustrates an example of a computing system 100 according to one embodiment. The system includes one or more nodes 102. In one embodiment, the system 100 may include four nodes 102. In a computing system, multiple nodes 102 may be operatively connected to one another for communicating such as making and responding to requests, as understood by one skilled in the art.

Each node 102 includes one or more central processors 105. In one embodiment, each node 102 includes six central processors 105. The central processors 105 include one or more cores 130 that perform the reading and executing of instructions. In one embodiment, one or more of the central processors 105 include four cores 130. Of course, the central processors 105 could include any number of cores 130 that is greater than or equal to two.

Each core 130 is operatively coupled to its own L1 and L2 cache, 107 and 109 respectively. The L1 caches 107 are physically closest to the cores 130 and the L2 caches 109 are coupled to the L1 caches 107. Each L2 cache 109 in each central processor 105 is coupled to a single L3 cache 111. In this manner, the L3 cache 111 is shared by multiple L2 caches 107.

The node 102 also includes one or more L4 caches 110. The L4 caches 110 are operatively coupled to two or central processors 105. In this manner, the L4 caches 110 are shared by multiple L3 caches 111. The system 100 may also include main memory 150 operatively coupled to the L4 caches 110.

In one embodiment, the L3 caches 111 and L4 cache 110 are formed of embedded dynamic random access memory (DRAM) which will be referred to as eDRAIVI. Of course, it is understood by a skilled artisan that any other types of suitable memory such as DRAM may be utilized. In one embodiment, the L2 caches 109 may be formed of static random access memory (SRAM).

In one embodiment, each individual central processor 105 is fabricated on its own separate chip, which includes the L1, L2, and L3 caches, and the L4 cache 110 is fabricated on its own separate chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others.

In an exemplary embodiment, the L1 caches 107 are between 96 and 128 kilobytes (KB), the L2 caches 109 are 1.5 MB, the L3 cache is 24 megabytes (MB) and the L4 cache 110 is 192 MB. Of course other sizes could be utilized. In FIG. 1, the four different levels of caches (L1, L2, L3 and L4) are shown. Of course, such an organization of caches is exemplary only and the teachings herein may be applied to any situation where multiple requesters have access to a shared cache and the shared cache is one of a plurality of shared caches that have access to another shared cache.

Figure 2:
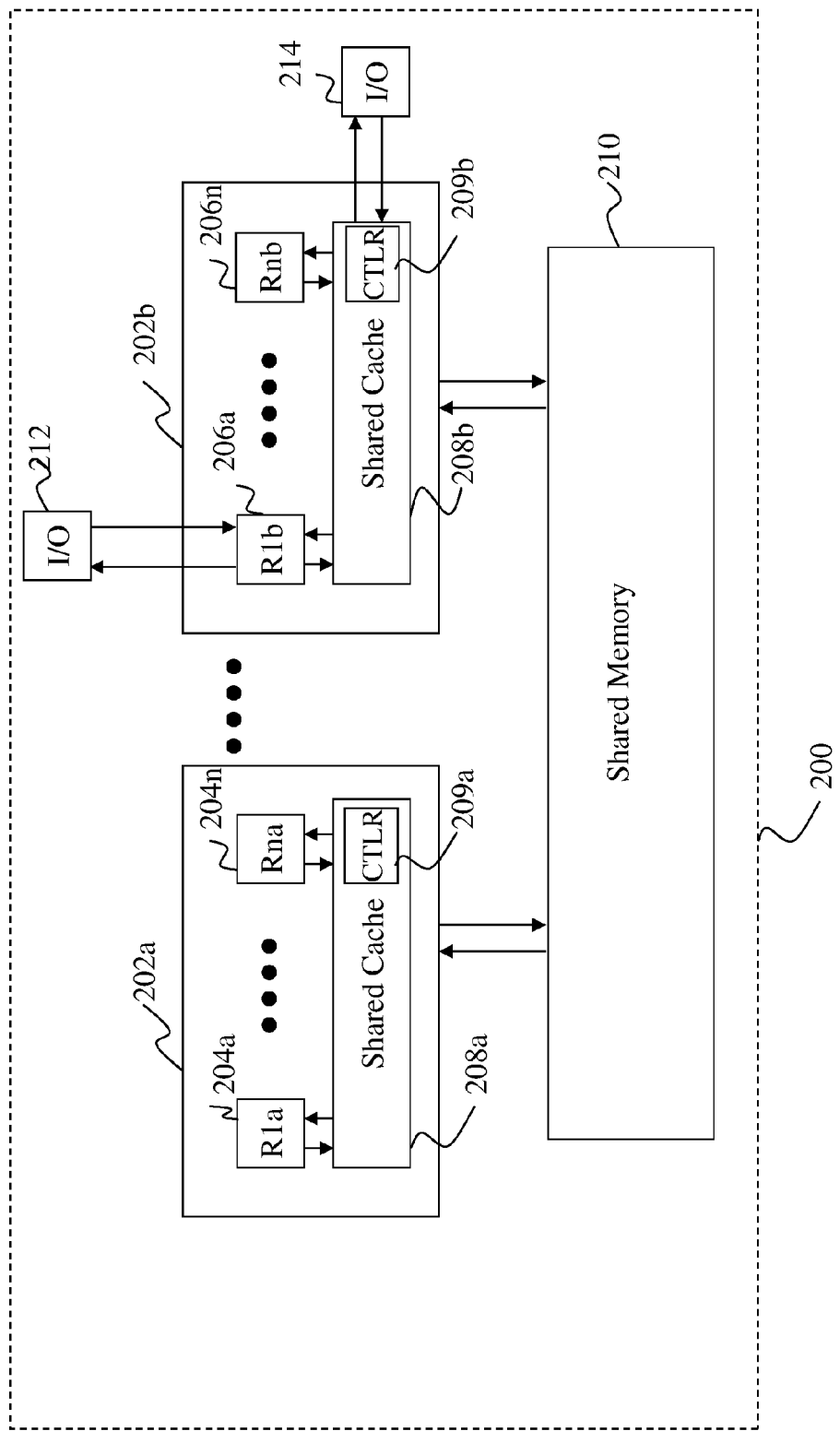
FIG. 2 depicts an alternative embodiment of a system on which embodiments of the present invention may be implemented.

FIG. 2 illustrates an alternative embodiment of a node 200. In this embodiment, the node 200 includes one or more central processors 202a . . . 202b. Each central processor 202 includes a shared cache 208 (208a, 208b) that includes a shared cache controller 209 (209a, 209b). The node also includes a shared memory 210 that may be accessed by each of the shared caches 208.

In general, the shared caches 208 receive requests for information (including both data and instruction requests) and if the requested data is contained in the shared caches 208 (cache hit), this request can be served by simply reading the shared cache 208. Otherwise, a cache miss occurs and the data is requested from shared memory 210. The determination of whether a cache hit or miss exists and the general operation of the shared cache 208 is controlled by the shared cache controller 209.

In one embodiment, the shared cache controller 209 is implemented to include a pipeline and other elements. The shared cache controller 209 may also be responsible for coherency checking. In one embodiment, the shared caches 208 are store-in or write back caches. Accordingly, in such an embodiment, each time data in the shared cache 208 is changed, the corresponding data in shared memory 210 is not updated.

In more detail, each shared cache 208 is coupled to two or more requesters. For example, shared cache 208a is coupled to requesters 204a . . . 204n and to shared memory 210, all of which may issue requests to the shared cache 208a. For example, shared memory 210 or requesters 204a . . . 204n may request a copy of a particular cache line contained in shared cache 208a. In one embodiment, the requesters 204a . . . 204n are caches. However, the requesters may include other types of devices. For example, requesters 206a . . . 206n are coupled to shared cache 208b in central processor 202b. In one embodiment, requester 206a is an input/output (I/O) device controller and is coupled to an I/O device 212. The I/O device 212 may be located on a separate chip than central processor 202b. Of course, some I/O devices may include internal drivers and may be directly coupled to the shared cache 208b. One of ordinary skill in the art will realize that other embodiments where a shared cache 208 is coupled to a shared memory 210 and to two or more other requesters, regardless of whether the other requesters are on the same chip as the shared cache, are within the scope of the present invention.

Figure 3:
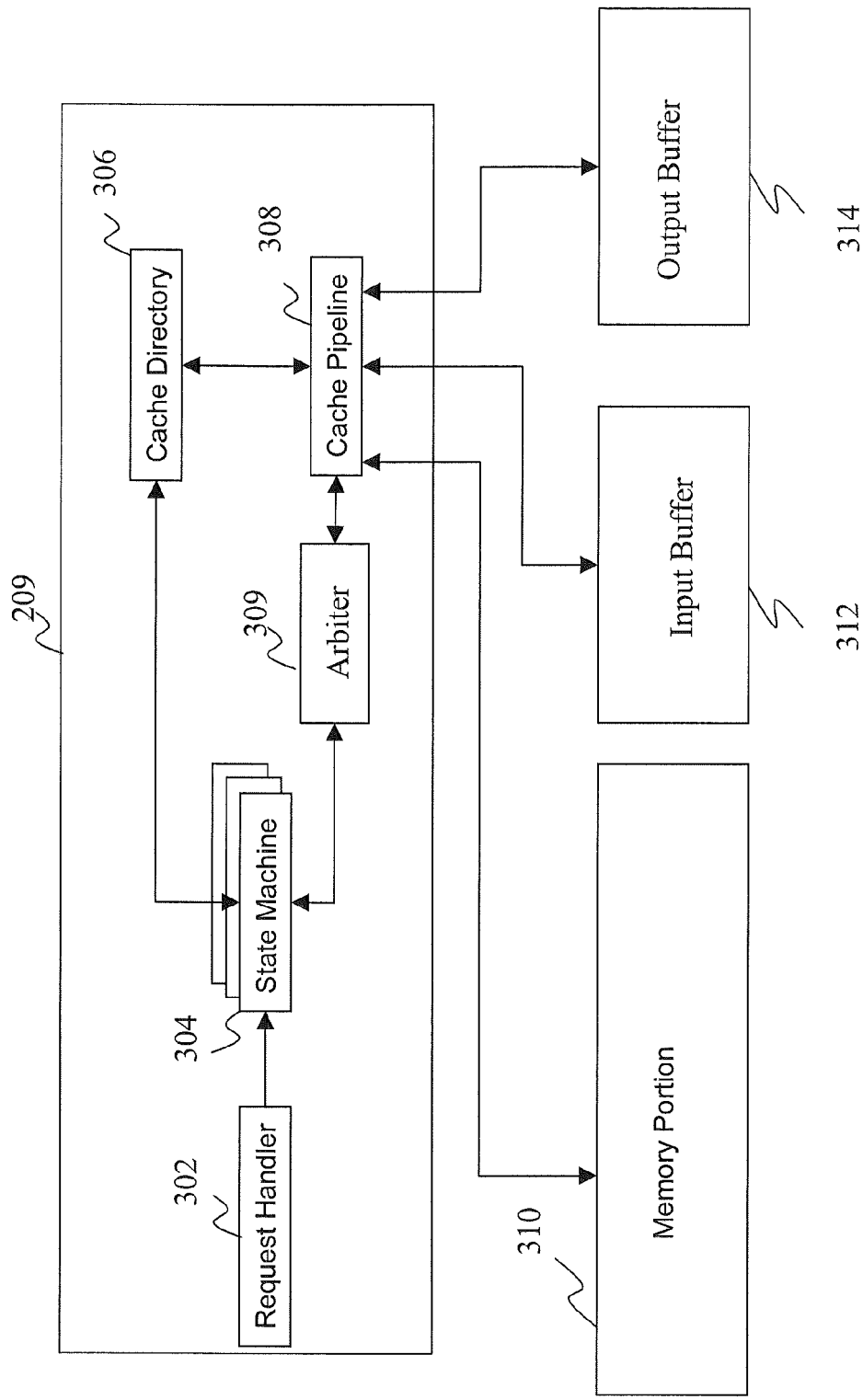
FIG. 3 depicts an example of a cache controller according to one embodiments.

FIG. 3 illustrates an example of the shared cache controller 209. The shared cache controller 209 includes a request handler 302. The request handler 302 receives requests from multiple requesters as described above. For example, the request handler may receive requests from L2 cache 109 or L4 cache 110 (FIG. 1). After receipt of a request from a requester, the request handler 302 classifies the request as a particular type of operation. Of course, the request itself may include a code that identifies the operation and such a classification by the request handler 302 may not be required.

For each possible type of operation, the shared controller 209 may include one more state machines 304. For example, for each possible requester (e.g., L2 109, L4 110 or I/O devices 212 and 214) the shared controller 209 may include one or more fetch state machines that provide data to an external location and one or more store state machines that bring data in from an external location. The external location could be another cache, main memory, or an I/O device, for example.

In operation, the request handler 302 assigns requests to a particular one of the state machines 304. The state machines 304 are coupled to and receive information from a cache directory 306. The cache directory 306 includes information about each cache line stored in the memory portion 310 of the cache in which the shared cache controller 209 is resident. In one embodiment, the cache directory is configured to provide an indication of when a first pipe pass begins.

The state machines 304 divide the operation into a series of states. Typically, the state machines are implemented in hardware but may be implemented in software or in a combination thereof. Some of these states may cause a processing request to be generated. The process requests may include, for example, requests to send coherency updates, access cache data to provide to an external location or access the cache to store data received from an external location.

In the prior art, state machines typically required that processing associated with a first state be completed before beginning processing associated with a second state. Indeed, that is the very nature of the prior art state machine, a state must complete (including processing) before a second state is entered. Accordingly, such state machines did not send processing requests for the second state until after the processing associated with the first state was completed. In contrast, in embodiments of the present invention processing requests may be sent for a second state before processing of the first state is completed. In particular, if the processing associated with the first state has begun and that processing includes no possible branches or delays, then the processing request for the second state may be sent before processing associated with the first state completes.

Referring again to FIG. 3, the state machines 304 are coupled to and provide the processing requests to an arbiter 309. The arbiter 309 assigns priority, based on arbitration algorithms, to certain processing requests. The processing requests are ultimately provided to cache pipeline 308.

The cache pipeline 308 is coupled to both the cache directory 306 and the arbiter 309. In addition, the cache pipeline 308 may be coupled to memory portion 310 in the shared cache 209 (FIG. 2) and an input buffer 312 and an output buffer 314 that, respectively, are utilized to receive data from and provide data to elements external to the shared cache 209. The memory portion 310 contains the cache lines contained in the cache.

In general, the cache pipeline 308 causes data to be moved from the memory portion 310 to the output buffer 314 and from the input buffer 312 to the memory portion 310. In addition, the cache pipeline 308 may cause information in the output buffer 312 to be transferred to an external device and for data in the input buffer 312 to be transferred to the output buffer 314. Of course, the cache pipeline 308 may perform other duties as well. For example, the cache pipeline 308 may send coherency requests to other caches. In such a case, the cache pipeline may stall while waiting for a response from the other cache.

Processing an operation in the cache pipeline 308 is actually a succession of discreet steps that each requires access to the cache pipeline 308. The exact sequence of steps that any given operation follows is dependent on the state of the operation as determined by the state machine 304 from information it may receive from the cache directory 306. For example, the instructions provided to the cache pipeline 308 (through the arbiter 309) may be dependent on variables such as the ownership state of the cache line of interest, whether the data in the cache line of interest has been changed and if there are any conflicts. Many of theses instructions are tightly coupled with each other as described in greater detail below.

In one embodiment of the present invention, for tightly coupled instructions, instead of waiting for the first of two tightly coupled instructions to fully pass through the cache pipeline 308 before providing the second instruction to arbiter 309, the second instruction may be provided before the first instruction is fully passed through the cache pipeline 308. Operation in such a manner may save one or more cycles of processing time in some cases.

An example is instructive. Suppose that the cache controller 209 is implemented in an L3 cache 111 as shown, for example, in FIG. 2. In some cases, the L4 cache 110 may request access to a particular cache line. Such a request may be received by the request handler 302 and be assigned to a state machine 304. In particular, the state machine 304 may be a remote fetch state machine. A remote fetch state machine typically performs the following three steps in a complete pass: 1) send coherency update requests to lower level caches; 2) access cache data and update the cache directory; and 3) provide the data to the L4 cache. Step 1 may involve several different passes through the cache pipeline 308. For example, depending on whether or not the cache line is dirty in the L2 cache, the L3 cache may need to be updated before step 2 can be performed. Accordingly, step 2 cannot be performed before step 1 is completed.

In contrast, steps 2 and 3 are tightly coupled. Tightly coupled steps occur when a first step, once started, cannot be stopped. In this case, once L3 cache data is being accessed, it will complete. In one embodiment, step 2 includes transferring in one or many steps, the desired cache line from the memory portion 310 to the output buffer 314. After this process has begun, a request to transfer the contents of the output buffer 314 may be made. It is known that step 2 will complete so, once started, the next step (step 3) can be requested without any fear that the data will not be available on output buffer 314 for transfer to the L4 cache.

FIG. 4 displays a flow chart of a typical sequence of operations that an L3 cache controller may perform. In this example, some of the steps may be performed by a state machine. The request is received at a block 401. The request may be, for example, from an L4 cache that wishes to lock a particular cache line. In order to do so, the L4 cache may need to make certain that its version of the particular cache line is the most current version. In order to do this, the L4 cache may send a coherency request to one or more L3 caches that have or have had a copy of the cache line (assuming this is a store in cache, the copies in the L3 and L4 caches are not necessarily the same). Thus, in this example, the request received at block 401 may be a coherency request.

At a block 402 it is assumed that the L3 cache contains the requested cache line and the request is assigned to a state machine. As discussed above, in this example, the state machine is a remote fetch state machine. Of course the teachings herein could be applied to a state machine other than a remote fetch state machine.

At a block 404 the state machine enters a coherency determination state. In this state, the state machine will first cause a coherency request to be sent to lower level caches (e.g., L2 caches). Depending on the status of the L2 cache, this request may generate additional requests (pipe passes) and may, in some instances, result in the contents of the L2 being written into the L3 cache. Accordingly, the coherency determination state may vary in length. Accordingly, the process remains in wait state 408 until an indication is received that the coherency determination state has reached an endpoint (block 406) and that that end point does not end the process. For example, the coherency determination state may determine that the L3 cache (and consequently, the L4 cache) includes the most recent version of the cache line. In such a case, there is no need to process the request further.

In the event that further processing is required, at a block 410 a send cache update request is sent to the arbiter. At a block 414 it is determined if the cache update has begun (i.e., has the arbiter selected the request for processing by the cache pipeline). If it has not, the process stalls in block 416 until the cache update begins. At this point, it is known that the cache update will complete as described. Thus, even before the cache update is completed, a request to transfer the cache line from the output buffer to the requester is initiated as shown at block 418.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider or ISP).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:
1. An apparatus for storing electronic information, the apparatus comprising:
    a first requester;
    a second requester;

a shared cache coupled to both the first requester and the second requester, the shared cache including:
  a cache controller configured to receive a first request from the second requester and provide a response to the second requester, the response being based on a status of the first requester, the cache controller including:
    a cache pipeline; and
    a state machine configured to process the first request by transmitting first and second pipe pass requests for access to the cache pipeline, the state machine configured to transmit the second pipe pass request before a first pipe pass caused by the first pipe pass request is completed.

2. The apparatus of claim 1, wherein the cache controller further includes:
an arbiter coupled to the state machine and the cache pipeline and configured to receive the first pipe pass request and the second pipe pass request.

3. The apparatus of claim 1, wherein the cache controller further includes:
a cache directory coupled to the cache pipeline and the state machine and configured to provide an indication of when the first pipe pass begins.

4. The apparatus of claim 1, wherein the first requester is on a same chip as the shared cache.

5. The apparatus of claim 4, wherein the second requester is on a different chip than the shared cache.

6. The apparatus of claim 1, wherein the first requester is an L2 cache, and the second requester is an L4 cache.

7. The apparatus of claim 6, wherein the first requester is formed of static random access memory (SRAM) and the second requester and the shared cache are both formed of embedded dynamic random access memory (eDRAM).

8. The apparatus of claim 1, wherein the first requester is an input/output device and the second requester is an L4 cache.

9. The apparatus of claim 8, wherein the first requester is on a first chip and the second requester is on a second chip and wherein the first chip is different than the second chip, and wherein the first and second chips are both different chips than a chip on which the shared cache is located.

10. The apparatus of claim 1, wherein the cache controller further includes a request receiver configured to receive the first request and to determine a type of the state machine.

11. The apparatus of claim 10, wherein the first request is a coherency request and the state machine is a remote fetch state machine.

12. The apparatus of claim 11, wherein the shared cache further includes:
a memory portion for storing data in the shared cache and coupled to the cache pipeline; and
an output buffer coupled to the memory portion and the cache pipeline;
wherein the first pipe pass causes the cache pipeline to copy data stored in the memory portion to the output buffer and the second pipe pass request includes an instruction that causes data in the output buffer to be transferred to the second requester.

13. A computer implemented method of performing operations in a shared cache coupled to a first requester and a second requester, the method comprising:
receiving at the shared cache a first request from the second requester;
assigning the first request to a state machine;
transmitting a first pipe pass request from the state machine to an arbiter;
providing a first instruction from the first pipe pass request to a cache pipeline, the first instruction causing a first pipe pass; and
providing a second pipe pass request to the arbiter before the first pipe pass is completed.

14. The method of claim 13, wherein the first request is a coherency request.

15. The method of claim 13, wherein the first instruction causes data to be moved from to an output buffer of the shared cache.

16. A memory system for use in a computing system, the memory system comprising:
a plurality of processing units;
at least two lower level caches each coupled to one of the plurality of processing units;
an upper level cache;
a shared cache coupled to the at least two lower level caches and the upper level cache, the shared cache including:
  a cache controller configured to receive a first request from the upper level cache and provide a response to the upper level cache, the response being based on a status of at least one of the at least two lower level caches, the cache controller including:
    a cache pipeline; and
    a state machine configured to process the first request by transmitting first and second pipe pass requests for access to the cache pipeline, the state machine configured to transmit the second pipe pass request before a first pipe pass caused by the first pipe pass request is completed.

17. The memory system of claim 16, wherein the cache controller further includes:
an arbiter coupled to the state machine and the cache pipeline and configured to receive the first pipe pass request and the second pipe pass request.

18. The memory system of claim 16, wherein the at least two lower level caches are on a same chip as the shared cache.

19. The memory system of claim 18, wherein the upper level cache is on a different chip than the shared cache.

* * * * *